April 10, 1956        J. L. BILLS        2,741,648
PRODUCTION OF ACETYLENE
Filed May 25, 1953
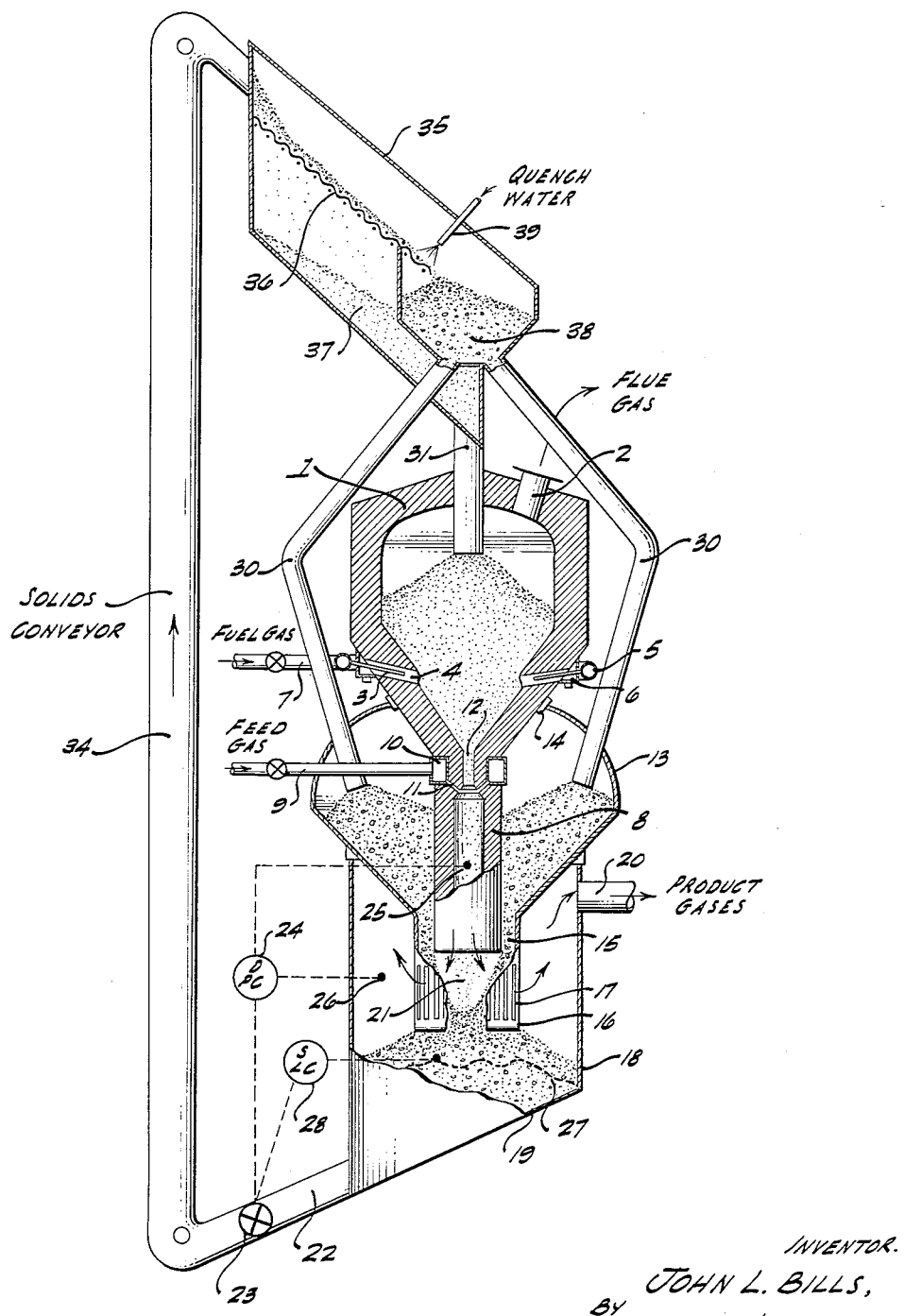
INVENTOR.
JOHN L. BILLS,
BY
Lannas S. Henderson
AGENT.

United States Patent Office 2,741,648
Patented Apr. 10, 1956

2,741,648

PRODUCTION OF ACETYLENE

John L. Bills, Long Beach, Calif., assignor to Union Oil Company of California, Los Angeles, Calif., a corporation of California Application May 25, 1953, Serial No. 357,279

14 Claims. (Cl. 260—679)

This invention relates to methods and apparatus for the production of acetylene and other unsaturated hydrocarbons by the thermal cracking or partial oxidation of hydrocarbon gases at high temperatures. More specifically it is concerned with cracking methods employing a solid, particle-form heat transfer medium to supply the thermal energy for the reaction. The essential features of novelty reside in certain specific procedures for contacting the feed gases concurrently with sparsely distributed hot solids, and then immediately quenching the hot product gases by contacting them with a concurrently moving, compact body of relatively cooler solids.

In the thermal cracking of hydrocarbon gases to form acetylene and other unsaturated hydrocarbons, the essential requirements are that the feed gases should be heated to a high temperature, in the neighborhood of 1500° to 3000° F., and maintained at such temperatures for a very short period of time. If the reaction time is extended longer than about 0.5 second, the yield of acetylene drops off rapidly, much coke is formed, and the product gases contain higher proportions of undesired products resulting from various side reactions. As a practical matter it is necessary to limit the reaction period to between about 0.001 second and 0.5 second, and preferably between about 0.005 and 0.1 second.

The attaining of such short reaction times at such high temperatures has presented many difficulties, some of which center about the methods employed for cooling the reaction gases as rapidly as possible. This rapid reduction of the temperature of the product gases has long been known to be desirable, and it has been accomplished by such means as quenching the effluent gases with cold water sprays, by steam dilution, or by injecting oil, which may in some instances be the feed stock to the process. Quenching with water is disadvantageous in that it causes a loss of soluble products in the water upon condensation from the effluent gases, and also unduly dilutes the product gases, thereby increasing the volume which must be treated for the recovery of the desired product. It has been the practice to inject as a spray sufficient water to lower the temperature of the gas, and raise that of the water, to about 150° F., requiring a large volume of water. Such a procedure is very wasteful of heat inasmuch as the resulting product gas is at such a low temperature as to be useless for other process heating. To avoid some of the foregoing disadvantages it has been proposed to inject a stream of powdered solids into the product gas stream to form a gaseous suspension whereby heat is absorbed by the powder. Such a system presents further difficulties which include the separation of the powder from the suspension, and the unattainability of true concurrent contact of gases with cool solids in such manner as to give a maximum initial cooling gradient. The optimum type of cooling should result in a sharp initial temperature drop to e. g. about 800–1400° F., to stop the reaction, and then a more gradual cooling, or none at all if the product gas is to be utilized, for example, for preheating feed gas, fuel gas, or air for the process.

In employing hot solids for heating and cool solids for quenching the gases, a problem is presented of how to transfer the hot gases rapidly from the hot solids into the mass of cool solids. Manifestly if there is any intervening distance between the bodies of hot and cold solids, the reaction gases will be held at the dead reaction temperature for at least the time required to traverse the distance between the two. It is therefore highly desirable to maintain the distance between the two bodies of solids at a minimum in the zone of gas transfer. For this purpose substantially contiguous bodies of solids are indicated. It is also desirable that the hot and cold solids should not mix to any appreciable degree before the gases are transferred from the hot solids to the cold solids.

U. S. Patent 2,548,286 to Bergstrom discloses the transfer of hot reaction gases from an ill-defined hot zone of compact granular solids to a surrounding contiguous zone of colder compact solids, but the hot and cold zones are characterized by an indefinite demarcation, over which there is necessarily a temperature gradient. Furthermore, since the reaction gases are expanding outwardly through concentric spheres to reach the cold solids, their residence time in the intermediate temperature zone is much greater per radial inch than in the inner, hot zones. This relationship makes adequate control of reaction time difficult, and also necessitates very high gas velocities in the hot zones resulting in increased coking and lower yields of acetylene as will be more fully explained hereinafter. By the process described herein a sharp line of demarcation is maintained between the hot and cold solids, while at the same time high gas velocities over hot solids are avoided.

Aside from the problem of obtaining rapid quenching of the gases when employing granular heat transfer media, other pertinent factors must be considered. For example, it has been found that when the reaction gases are heated by means of hot solids it is distinctly preferable to maintain the differential velocity between gases and solids at as low a value as possible, preferably less than about 20 feet per second. The reason for this phenomenon is not understood with any degree of certainty, but has been described more particularly in the co-pending application of John L. Bills, Serial No. 283,269, filed April 21, 1952. That application shows that when the feed gases are passed at high relative velocities over hot solids a lower yield of acetylene is obtained than e. g. when the gases are passed through the reaction zone concurrently and at substantially the same velocity with the solids. However, for reasons of thermal efficiency and economy in solids handling, the heating solids should be sparsely distributed in the gas stream; concurrent, iso-velocitous flow of gases with a compact bed of solids involves prohibitive solids circulation rates, and also fails to utilize efficiently the sensible heat of the solids. The present invention embodies methods for obtaining concurrent, iso-velocitous flow of feed gases with dispersed hot solids, coupled with means for rapidly transferring the reacted gases to a cold body of compact, moving solids, and flowing the gases concurrently and transversely therethrough to obtain an optimum cooling gradient.

It will be seen therefore that one of the principal objects of this invention is to provide means and methods for employing granular quenching solids in combination with granular heating solids whereby the time lag between removal of the gases from the hot solids and contact thereof with the cool solids is minimized.

A further objective is to maintain a sharp line of demarcation between hot and cold solids at the gas transfer zone, i. e. to maintain a sharp temperature gradient in the solids at the zone of transfer.

A further object is to provide methods and means whereby hydrocarbon gases may be thermally cracked by concurrent contact with relatively sparsely distributed hot solids, and rapidly quenched by contact with a substantially contiguous compact bed of cold solids moving concurrently with said gases.

A further objective is to provide for efficient recovery and utilization of the thermal energy required in the process. This latter objective is achieved by quenching the reaction gases only to a temperature which stops further reaction, i. e. between about 800° and 1400° F. The gases removed at these temperatures may then be utilized efficiently for preheating feed gases, fuel gases, solids, etc. Other objects of the invention will be apparent to those skilled in the art from the description which follows.

The feed materials which may be employed herein consist predominantly of the lower hydrocarbon gases such as methane, ethane, propane, butane, ethylene, propylene and mixtures thereof such as natural gas. Higher hydrocarbons may also be employed. These gases may be employed as such or they may be mixed with other gases such as oxygen, hydrogen, air, steam, etc. If oxygen or air is employed the process is a partial oxidation. Hydrogen may sometimes be advantageous to repress coke formation. Inert diluents such as nitrogen or steam also retard coking by lowering the partial pressure of the reactant gases.

Briefly, the process described herein consists in dispersing a stream of granular solids heated to a temperature between about 1800° and 3000° F. into a feed-gas stream, and flowing the dispersion downwardly through a reaction zone. At the lower terminus of the reaction zone a converging, compact stream of relatively cool solids is introduced contiguously to and surrounding the emerging stream of hot solids and gases. At the same time a sufficiently high pressure is maintained above the body of cold solids so that the hot product gases will flow outwardly and downwardly with and through the curtain of cold solids. Conversely, it is necessary to maintain a lower pressure in the vessel which receives the mixed hot and cold solids than is maintained above the cold solids in order to prevent the gases from flowing upwardly and countercurrently to the cold solids. The mixture of hot and cold solids emerging from the gas-transfer zone will be at a temperature somewhere between the original extremes. This mixture may then be lifted through a suitable lift line into a hopper positioned above the reaction zone. From the hopper the solids are then divided into one stream which is preheated for the reaction zone, and another stream which is cooled for the cooling-zone solids.

The solids employed herein may be any granular, refractory material capable of withstanding the temperatures and temperature changes encountered. Suitable materials include for example coke, petroleum coke, alundum, aluminum oxide, magnesium oxide, spent catalyst granules, pumice, firebrick, carborundum, zirconia, mullite, beryllia, etc. The particles may range in size from about ½ inch in diameter down to about 100 mesh or smaller. It is preferred to employ particles in the smaller size range for heating the gases since such particles most readily and nearly assume the velocity of the surrounding gases due to their high surface area/mass ratio. The quench solids may be of a similar size, but preferably are substantially larger than the heating solids in order to facilitate their use as a compact bed, and prevent the formation of gas-solids suspensions. The heating solids preferably should be between about 10 and 100 average mesh size, while the cooling solids may be between about 4 and 20 average mesh size.

The process may perhaps be more readily understood by referring to the accompanying figure which is a cross-sectional view of a suitable apparatus for carrying out the process.

Referring to the figure the numeral 1 designates the preheater for the hot solids, which may be of any conventional design, as for example a cylindrical refractory vessel having a roughly conical lower portion to facilitate the flow of solids. The construction materials employed should be capable of withstanding temperatures up to at least about 3000° F. A flue gas outlet 2 is provided near the top. The solids in the preheater are heated by means of one or more burners 3 which are radially positioned around the lower circumference of the preheater, and enclosed within inclined ports 4. The burners 3 are fed by means of an annular fuel gas manifold 5 positioned around the lower part of preheater 1. The inner portion of burners 3 are enclosed within a wind box 6 which is also positioned annularly around the bottom of the preheater. Fuel gas is fed into gas manifold 5 through gas line 7. It will thus be seen that the fuel gas is burned in the ports 4 and the hot flue gases pass upwardly through the solids and out through the flue gas outlet 2.

Depending from the bottom of preheater 1, and communicating therewith through a restricted throat 12, is a tubular reactor 8 which forms the actual reaction zone. This reactor may be constructed of any suitable ceramic or refractory, preferably of the same material as preheater 1. The internal diameter of the reactor may vary considerably, e. g. from an inch or two up to about one foot. The length of the reactor is determined by several factors such as the gas velocity which it is desired to maintain, the gas composition, etc. In any event it should be of sufficient length to provide a contact time between about 0.001 and 0.5 second at the desired gas velocity. Suitable lengths may range for example between 1 and 50 feet. The feed gas, preferably preheated to between about 1400° and 1800° F., is introduced through gas conduit 9 into gas distributing manifold 10, from which it passes inwardly through an inverted frusto-conical slit 11 to the upper domed portion of the tubular reactor 8. The downward flow of gas from slit 11 aspirates solids from throat 12, forming a downflowing gas-solids dispersion or suspension. The proportion of solids admixed with the gases depends upon the cross-sectional area of throat 12 and the velocity of gases flowing through slit 11. These two factors should be so correlated that between about 0.2 and 10 pounds of solids per standard cubic foot of gas are aspirated into the top of reactor 8. By utilizing these gas-solids ratios, adequate heating may be obtained in concurrent, substantially iso-velocitous flow without excessive solids circulation rates, and with a minimum heat waste.

Surrounding the tubular reactor 8 is a conical hopper or surge-vessel 13 which serves as a container for cool solids. This hopper may be constructed of ordinary metallic materials since it is not required to sustain such high temperatures as preheater 1 and reactor 8. A suitable gas-tight annular seal 14, of asbestos or other heat resistant material is provided between the upper portion of hopper 13 and the lower portion of preheater 1. The lower portion of hopper 13 converges conical-wise to form a relatively narrow annulus, indicated at 15, between its inner circumference and the outer circumference of the lower end of tubular reactor 8. The cross-sectional area of the annulus 15 should be balanced against the contemplated gas flow rates so as to provide the proper relative flow rates of hot gases and cold solids. The solids in hopper 13 may be introduced at any temperature substantially below that of the reaction gases, preferably between about 200° and 1400° F. Their rate of flow may vary widely, e. g. between about 0.5 and 50 pounds per standard cubic foot of feed gas. The lower the temperature of the cool solids, the lower may be their relative flow rate. For example if the cool solids are introduced to hopper 13 at temperatures between about 200° and 500° F., the optimum flow rate is between about 1.0 and 10 pounds thereof per s. c. f. of feed gas.

Below the annulus 15, the lower portion of hopper 13 terminates in a cylindrical standpipe 16, perforated with a plurality of vertical, circumferentially spaced slits 17, or other type of perforation. The standpipe 16 is enclosed within a gas-tight cylindrical metal vessel 18 having an inclined bottom 19 to facilitate solids flow. Vessel 18 is also provided with an outlet pipe 20 for the product gases. The slits 17 should preferably be sufficiently narrow to prevent the flow of cool solids therethrough, and should extend upwardly not above the lower terminus of reactor 8 in order to avoid countercurrent flow of product gases against the cool solids. The slits 17 should preferably terminate substantially below the lower end of reactor 8, e. g. from about 2 to 24 inches. The principal gas-flow path through the cool solids is then from the lower end of reactor 8 to the upper portion of slits 17. It will be seen that this path is concurrent and transverse to the flow of cold solids. This relative flow direction is found to give the optimum cooling gradient, i. e. initially rapid, but incomplete.

The solids level in vessel 18 may be maintained in general at either of two different levels. According to the principal modification illustrated, the solids form a compact bed up to the lower end of standpipe 16. In this modification it is necessary to maintain a solids level inside standpipe 16 which is substantially below the lower end of reactor 8. The flowing solids will then converge to form an inverted conical free space 21 defined essentially by the repose angle of the cool solids flowing past annulus 15. The hot, dispersed solids emerging from the lower end of reactor 8 tend to accumulate mainly at the lower part of the space 21 due to their downward inertia, while the emerging gases immediately begin to expand outwardly through the path of least resistance toward the low pressure zone in vessel 18. The gas path of least resistance is through the least bed thickness of solids, i. e. through the peripheral layers of solids surrounding the upper portion of space 21. This effect is further accentuated if the heating solids are smaller than the cooling solids, since the former accumulate mainly in the zones of greatest resistance to gas-flow, thereby further increasing the frictional resistance to gas-flow of those zones. It will be seen therefore that a substantial separation of hot gases from hot solids is achieved before the hot gases contact the cold solids. In other words, the hot and cold solids are not mixed appreciably until the hot gases have passed through the cold solids.

In order to maintain the conical free space 21 below reactor 8 it is necessary to regulate the flow of mixed solids from vessel 18. These solids are removed through conduit 22, and the rate of removal is regulated by means of a valve 23. The valve 23 may in turn be controlled by means of a differential pressure controller 24 of any conventional design which is responsive to the differential pressure between a point 25 within reactor 8 and a point 26 within vessel 18. When the differential pressure between points 25 and 26 is high, this means that the solids level defining the free space 21 is rising upwardly into reactor 8. When this occurs differential pressure controller 24 opens valve 23 to increase the flow of solids. When the differential pressure between points 25 and 26 is low, it means that the solids level within standpipe 16 is falling downwardly, thereby permitting freer flow of gases through slits 17 and around the lower end of standpipe 16. When this occurs differential pressure controller 24 operates to close valve 23 thereby cutting down the flow of solids, and thus again building up the solids level within standpipe 16 to the desired level. By operating in this manner the major part of the reaction gases are diverted outwardly through the coolest parts of the descending cool solids, i. e. the gases are rapidly separated from the hot solids and diverted to the cold solids.

Alternatively, the solids level in vessel 18 may be maintained at any level below the end of standpipe 16. In this case the cold solids merely fall freely past annulus 15 forming a cylindrical curtain around the emerging gases and solids from reactor 8, and the hot reaction gases flow outwardly through slits 17 and/or around the lower end of standpipe 16. In any case they must pass through the cylindrical curtain of cold solids. In this modification the solids level in vessel 18 may be maintained at for example a line indicated at 27, and this level may be regulated by making valve 23 responsive to a solids level controller 28.

The mixed hot and cold solids removed through conduit 22 are then transported in a solids conveyor 34, which may be of any conventional design, to a solids classifier 35 positioned above the preheater 1. The solids classifier may be of any conventional design, the essential element of which is a sieve or screen 36 over which the mixed solids gravitate downwardly with the smaller particles accumulating in a lower chamber 37 and the larger particles falling into a cool solids hopper 38. The solids falling in hopper 38 may be cooled by any conventional means, as for example a water spray 39. The cool solids accumulating in hopper 38 then flow by gravity through conduits 30 to hopper 13. The finer particles accumulating in the lower chamber 37 flow by gravity through conduit 31 to preheater 1.

In the event that the solids employed for heating and for cooling are of the same size, the classifier 35 may be omitted, and all the solids raised through lift line 34 may be collected in a common hopper to which is attached appropriate conduits to hopper 13 and preheater 1. In this case it is feasible to cool the solids flowing to hopper 13 by means of conventional coolers inserted into the conduits 30.

Those skilled in the art will readily understand that the details of the apparatus illustrated may be modified considerably to obtain the same objectives, and such modifications are to be considered within the scope of this invention. The following example may serve to illustrate more specifically the operation of the above apparatus.

*Example 1*

A reactor similar to that illustrated in the accompanying drawing has the following critical dimensions:

| | |
|---|---|
| Overall height _____ft__ | 18 |
| Reactor tube: | |
|    Inside diameter _____inches__ | 4 |
|    Outside diameter _____do____ | 8 |
|    Length _____ft__ | 4 |
| Standpipe 16, inside diameter _____inches__ | 11 |

This apparatus is operated for example under the following conditions, employing methane preheated to 1200° F. as feed gas:

| | |
|---|---|
| Feed gas rate, s. c. f./hr_____ | 6,000 |
| Heating solids circulation rate, lbs./s. c. f. feed gas (30–40 mesh coke)_____ | 3.5 |
| Quench solids circulation rate, lbs./s. c. f. feed gas (5–10 mesh coke)_____ | 8.0 |
| Initial temperature of heating solids_____°F__ | 3200 |
| Initial temperature of quench solids_____°F__ | 300 |
| Approximate reaction time at 1800–3000° F., seconds _____ | 0.02 |
| Temperature of quenched reaction gases____°F__ | 900 |

Under these conditions, the product gases from the reactor are found to contain between about 5% and 8% by volume of acetylene.

To illustrate more specifically the beneficial effects which are obtained by flowing the feed gas and heating solids at the same velocity through the reaction zone the following example is cited:

*Example II*

A. A stream of natural gas at atmospheric pressure was preheated to 1400° F., and passed through a horizontal tubular reactor packed with 20–40 mesh coke particles in a stationary bed heated externally by means of an electric furnace to a maximum temperature of about 2800° F. The velocity of gas flow was about 400 feet per second and the contact time between 2000–2600° F. was about 0.01 second. After running the gases for 30 seconds, the reactor became almost completely plugged with carbon so that no further gas could be passed through. The product gases were collected and found to contain 2.2% acetylene by volume.

B. Under exactly similar conditions, but employing an empty tubular reactor, and aspirating the coke particles into the feed gas, whereby the gas-solid suspension was carried concurrently through the heated tube, the product gases were found to contain 4.2% of acetylene by volume.

C. By repeating Example II–B employing 20–45 mesh sillimanite particles instead of coke, an acetylene yield of 5.06% was obtained.

These experiments clearly indicate that the tortuous flow of feed gases in and around a stationary particle-form contact mass is disadvantageous from the standpoint of acetylene yield and coke production. The evidence indicates that such a procedure favors the breakdown of acetylene to coke. By contrast, flowing the gases concurrently with the solids in such manner as to minimize the relative gas-solids velocity, thereby reducing the frictional contact of gases with hot solids, results in greatly improved yields of acetylene, amounting to over 100% in some cases of that obtainable with a stationary contact bed. Obviously, a countercurrently flowing bed of contact material would be even more disadvantageous than a stationary bed, other factors being equal.

While the above description has been limited to the production of acetylene, the process may be easily modified to obtain other unsaturated hydrocarbons, such for example as butadiene, ethylene, acetylene homologs, etc. from the same type of feed gases. For these products it is preferable to employ temperatures within the range of about 1200–1400° F. and contact times of about 1–3 seconds or more.

The foregoing disclosure of this invention is not to be considered as limiting since many variations may be made by those skilled in the art without departing from the scope or spirit of the following claims.

I claim:

1. A process for the manufacture of acetylene by the pyrolytic conversion of hydrocarbons which comprises flowing a feed gas stream of said hydrocarbons concurrently with between about 0.2 and 10 pounds of dispersed granular heating solids per s. c. f. of said feed gas through a reaction zone wherein said feed gas is heated by said heating solids to between about 1800° and 3000° F. for between about 0.001 and 0.5 second, then immediately flowing the resulting gas-solids dispersion downwardly into a relatively low-pressure separation zone, maintaining in said separation zone a substantially compact, sharply defined stream of quench solids flowing concurrently and substantially contiguously to and surrounding, but discrete from, said emerging gas-solids dispersion whereby the hot gases in said dispersion are caused to flow concurrently and transversely through said stream of quench solids before any substantial intermingling of said heating solids and quench solids has occurred, said hot gases being rapidly cooled thereby to below about 1400° F., and recovering acetylene from the cooled gases.

2. A process as defined in claim 1 wherein said heating solids are substantially smaller in average particle size than said quench solids.

3. A process as defined in claim 1 wherein said heating solids are between about 10 and 100 average mesh size, and said quench solids are between about 4 and 20 average mesh size, and wherein the heating solids are substantially smaller in average particle size than the quench solids.

4. A process as defined in claim 1 wherein said heating solids and said quench solids are of substantially the same average particle size.

5. A process for the manufacture of acetylene by the pyrolytic conversion of hydrocarbons which comprises flowing a feed gas stream of said hydrocarbons concurrently with between about 0.2 and 10 pounds of dispersed granular heating solids per s. c. f. of said feed gas through a reaction zone wherein said feed gas is heated by said heating solids to between about 1800° and 3000° F. for between about 0.001 and 0.5 second, then immediately flowing the resulting gas-solids dispersion downwardly into a relatively low-pressure separation zone, maintaining in said separation zone substantially compact, sharply defined stream of quench solids flowing concurrently and substantially contiguously to and surrounding, but discrete from, said emerging gas-solids dispersion whereby the hot gases in said dispersion are first substantially separated from the said heating solids and then caused to flow concurrently and transversely through said stream of quench solids before any substantial intermingling of said heating solids and said quench solids has occurred, said hot gases being rapidly cooled thereby to below about 1400° F., and recovering acetylene from the cooled gases.

6. A process as defined in claim 5 wherein the said separation of hot gases from hot solids is achieved by allowing said heating solids to fall by inertia and gravity predominantly on an area of said quench solids which presents a maximum resistance to gas flow, and withdrawing said hot gases predominantly through a peripheral area of said quench solids which presents a lesser resistance to gas flow.

7. A process as defined in claim 6 wherein said heating solids are substantially smaller in average particle size than said quench solids.

8. A process as defined in claim 6 wherein said heating solids are between about 10 and 100 average mesh size, and said quench solids are between about 4 and 20 average mesh size, and wherein the heating solids are substantially smaller in average particle size than the quench solids.

9. A process as defined in claim 6 wherein said heating solids and said quench solids are of substantially the same average particle size.

10. An apparatus adapted for the pyrolysis of hydrocarbons to acetylene by contact with granular heat-transfer media comprising in combination an upper solids heating chamber, a tubular reactor communicating with the lower portion of said heating chamber through a constricted throat, a feed gas inlet port communicating with the lower portion of said throat and positioned in solids-aspirating relationship therewith; a surge-vessel positioned around said reactor, the lower portion of said surge-vessel being horizontally spaced outwardly from said reactor, being thereby adapted to flow a stream of solids downwardly past the lower end of said reactor, a solids-receiving vessel positioned below the lower end of said reactor and communicating directly therewith, said solids-receiving vessel having a gas outlet port, a solids elevator adapted to transfer solids directly from said solids-receiving vessel to a hopper positioned above said heating chamber, conduits connecting said hopper with said surge-vessel and with said heating chamber, and means for cooling solids flowing to said surge-vessel.

11. An apparatus as defined in claim 10 wherein the lower portion of said surge-vessel terminates in a cylindrical solids standpipe concentrically surrounding the lower end of said reactor and extending a substantial distance therebelow.

12. An apparatus as defined in claim 11 wherein said solids standpipe comprehends a zone of gas-pervious, solids impervious perforations positioned between its lower end and the end of said reactor.

13. An apparatus as defined in claim 12 including means for controlling the flow rate of solids from said solids receiving vessel in order to maintain an inverted conical solids level within said standpipe.

14. An apparatus adapted for the pyrolysis of hydrocarbons to acetylene by contact with granular heat-transfer media, comprising in combination an upper solids-heating chamber, a tubular reactor communicating with the lower portion of said heating chamber through a constricted throat, a feed gas inlet port communicating with the lower portion of said throat and positioned in solids-aspirating relationship therewith, a surge-vessel positioned around said reactor, the lower portion of said surge-vessel being horizontally spaced outwardly from said reactor, being thereby adapted to flow a stream of solids downwardly past the lower end of said reactor, a solids-receiving vessel positioned below the lower end of said reactor and communicating directly therewith, said solids-receiving vessel having a gas outlet port, a solids elevator adapted to transfer solids directly from said solids-receiving vessel to a hopper positioned above said heating chamber, a conduit positioned externally of said heating chamber and connecting said hopper with said surge-vessel, a second conduit connecting said hopper with said heating chamber, and means for cooling solids flowing through said external conduit to said surge-vessel.

References Cited in the file of this patent
UNITED STATES PATENTS

| | | |
|---|---|---|
| 2,422,501 | Roetheli | June 17, 1947 |
| 2,471,104 | Gohr | May 24, 1949 |
| 2,513,294 | Eastwood et al. | July 4, 1950 |
| 2,548,286 | Bergstrom | Apr. 10, 1951 |
| 2,614,968 | Simms | Oct. 21, 1952 |